(12) United States Patent
Tang

(10) Patent No.: US 9,951,266 B2
(45) Date of Patent: Apr. 24, 2018

(54) EXPANDED WELLBORE SERVICING MATERIALS AND METHODS OF MAKING AND USING SAME

(71) Applicant: Halliburton Energy Services, Inc., Houston, TX (US)

(72) Inventor: Tingji Tang, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 593 days.

(21) Appl. No.: 13/661,940

(22) Filed: Oct. 26, 2012

(65) Prior Publication Data

US 2014/0116711 A1 May 1, 2014

(51) Int. Cl.
| | | |
|---|---|---|
| C09K 8/62 | (2006.01) | |
| C09K 8/035 | (2006.01) | |
| C09K 8/70 | (2006.01) | |
| E21B 43/267 | (2006.01) | |

(52) U.S. Cl.
CPC ............ *C09K 8/62* (2013.01); *C09K 8/035* (2013.01); *C09K 8/70* (2013.01); *E21B 43/267* (2013.01)

(58) Field of Classification Search
CPC ........................................................ C09K 8/62
USPC ........................................ 166/308.4; 507/219
See application file for complete search history.

(56) References Cited

U.S. PATENT DOCUMENTS

| | | |
|---|---|---|
| 2,703,316 A | 3/1955 | Schneider |
| 3,912,692 A | 10/1975 | Casey et al. |
| 4,387,769 A | 6/1983 | Erbstoesser et al. |
| 4,585,064 A | 4/1986 | Graham et al. |
| 4,670,501 A | 6/1987 | Dymond et al. |
| 5,006,566 A | 4/1991 | Weber et al. |
| 5,216,050 A | 6/1993 | Sinclair |
| 5,249,627 A | 10/1993 | Harms et al. |
| 5,373,901 A | 12/1994 | Norman et al. |
| 5,833,000 A | 11/1998 | Weaver et al. |
| 5,839,510 A | 11/1998 | Weaver et al. |
| 5,853,048 A | 12/1998 | Weaver et al. |
| 5,905,061 A | 5/1999 | Patel |
| 5,960,880 A | 10/1999 | Nguyen et al. |
| 5,977,031 A | 11/1999 | Patel |
| 6,209,646 B1 | 4/2001 | Reddy et al. |

(Continued)

FOREIGN PATENT DOCUMENTS

WO 2008038033 A1 4/2008

OTHER PUBLICATIONS

Albertsson, Ann-Christine, and Indra K. Varma. "Aliphatic Polyesters: Synthesis, Properties and Applications." Advances in Polymer Science, vol. 157 (2001): pp. 1-40.*

(Continued)

*Primary Examiner* — William D Hutton, Jr.
*Assistant Examiner* — Ashish K Varma
(74) *Attorney, Agent, or Firm* — Craig Roddy; Baker Botts L.L.P.

(57) ABSTRACT

A method of servicing a wellbore in a subterranean formation comprising placing a wellbore servicing fluid comprising a resin-loaded expanded material into a wellbore wherein a resin is released from the resin-loaded expanded material in situ within the wellbore or subterranean formation. A wellbore treatment composition comprising a resin-loaded expanded material wherein the expanded material comprises polylactide and the resin material comprises a high-temperature epoxy-based resin.

20 Claims, 1 Drawing Sheet

(56) References Cited

U.S. PATENT DOCUMENTS

| | | |
|---|---|---|
| 6,257,335 B1 | 7/2001 | Nguyen et al. |
| 6,287,639 B1 | 9/2001 | Schmidt et al. |
| 6,311,773 B1 | 11/2001 | Todd et al. |
| 6,323,307 B1 | 11/2001 | Bigg et al. |
| 6,387,968 B1 | 5/2002 | Glück et al. |
| 6,439,309 B1 | 8/2002 | Matherly et al. |
| 6,527,051 B1 | 3/2003 | Reddy et al. |
| 6,554,071 B1 | 4/2003 | Reddy et al. |
| 6,582,819 B2 | 6/2003 | McDaniel et al. |
| 6,677,426 B2 | 1/2004 | Noro et al. |
| 6,782,735 B2 | 8/2004 | Walters et al. |
| 6,828,279 B2 | 12/2004 | Patel et al. |
| 6,877,563 B2 | 4/2005 | Todd et al. |
| 7,021,383 B2 | 4/2006 | Todd et al. |
| 7,036,587 B2 | 5/2006 | Munoz, Jr. et al. |
| 7,044,220 B2 | 5/2006 | Nguyen et al. |
| 7,131,491 B2 | 11/2006 | Blauch et al. |
| 7,153,575 B2 | 12/2006 | Anderson et al. |
| 7,166,560 B2 | 1/2007 | Still et al. |
| 7,281,581 B2 | 10/2007 | Nguyen et al. |
| 7,334,636 B2 * | 2/2008 | Nguyen .................. C09K 8/80 166/280.1 |
| 7,350,579 B2 | 4/2008 | Gatlin et al. |
| 7,380,600 B2 | 6/2008 | Willberg et al. |
| 7,392,847 B2 | 7/2008 | Gatlin et al. |
| 7,431,088 B2 | 10/2008 | Moorehead et al. |
| 7,455,112 B2 | 11/2008 | Moorehead et al. |
| 7,475,728 B2 | 1/2009 | Pauls et al. |
| 7,534,745 B2 | 5/2009 | Taylor et al. |
| 7,541,318 B2 | 6/2009 | Weaver et al. |
| 7,565,929 B2 | 7/2009 | Bustos et al. |
| 7,581,590 B2 | 9/2009 | Lesko et al. |
| 7,645,723 B2 | 1/2010 | Kirsner et al. |
| 7,673,686 B2 | 3/2010 | Nguyen et al. |
| 7,691,789 B2 | 4/2010 | Fu et al. |
| 7,696,131 B2 | 4/2010 | Oyler et al. |
| 7,775,278 B2 | 8/2010 | Willberg et al. |
| 7,779,915 B2 | 8/2010 | Hutchins et al. |
| 7,784,541 B2 | 8/2010 | Hartman et al. |
| 7,786,051 B2 | 8/2010 | Lange et al. |
| 7,819,192 B2 | 10/2010 | Weaver et al. |
| 7,825,074 B2 | 11/2010 | Schmidt et al. |
| 7,841,411 B2 | 11/2010 | Fuller et al. |
| 7,858,561 B2 | 12/2010 | Abad et al. |
| 7,896,068 B2 | 3/2011 | Lee |
| 7,934,556 B2 | 5/2011 | Clark et al. |
| 7,947,630 B2 | 5/2011 | Atkins et al. |
| 7,956,017 B2 | 6/2011 | Gatlin et al. |
| 8,003,579 B2 | 8/2011 | Akarsu et al. |
| 8,016,034 B2 | 9/2011 | Glasbergen et al. |
| 8,066,068 B2 | 11/2011 | Lesko et al. |
| 8,076,271 B2 | 12/2011 | Blauch et al. |
| 8,109,335 B2 | 2/2012 | Luo et al. |
| 8,136,595 B2 | 3/2012 | Weaver et al. |
| 8,163,826 B2 | 4/2012 | Willberg et al. |
| 8,167,043 B2 | 5/2012 | Willberg et al. |
| 8,230,925 B2 | 7/2012 | Willberg et al. |
| 8,261,833 B2 | 9/2012 | Nguyen et al. |
| 8,443,885 B2 | 5/2013 | Rickman et al. |
| 2006/0175058 A1 * | 8/2006 | Nguyen .................. 166/280.2 |
| 2007/0173416 A1 | 7/2007 | Moorehead et al. |
| 2008/0006405 A1 | 1/2008 | Rickman et al. |
| 2008/0087431 A1 * | 4/2008 | Willauer ................ E21B 43/04 166/290 |
| 2008/0210423 A1 | 9/2008 | Boney |
| 2009/0105097 A1 | 4/2009 | Abad et al. |
| 2009/0246501 A1 | 10/2009 | Shuler et al. |
| 2010/0044041 A1 | 2/2010 | Smith et al. |
| 2010/0160187 A1 | 6/2010 | Nguyen et al. |
| 2010/0273685 A1 | 10/2010 | Saini et al. |
| 2010/0300688 A1 * | 12/2010 | Panga et al. ................ 166/280.2 |
| 2010/0323932 A1 * | 12/2010 | Bustos .................... C09K 8/26 507/219 |
| 2011/0030958 A1 | 2/2011 | Fedorov et al. |
| 2011/0039737 A1 | 2/2011 | Schmidt et al. |
| 2011/0120712 A1 * | 5/2011 | Todd ...................... C04B 28/02 166/280.1 |
| 2011/0226479 A1 | 9/2011 | Tippel et al. |
| 2011/0227254 A1 | 9/2011 | Reck-Glenn et al. |
| 2011/0284222 A1 | 11/2011 | Chaabouni et al. |
| 2012/0024526 A1 | 2/2012 | Liang et al. |
| 2012/0225967 A1 | 9/2012 | Amano et al. |

OTHER PUBLICATIONS

Foreign communication from a related counterpart application—International Search Report and Written Opinion, PCT/US2013/061425, dated Jan. 8, 2014, 11 pages.

Filing receipt and specification for patent application entitled "Wellbore Servicing Methods and Compositions Comprising Degradable Polymers," by B. Raghava Reddy, et al., filed Oct. 29, 2013 as U.S. Appl. No. 14/065,701.

Albertsson, Ann-Christine, et al., "Aliphatic Polyesters: Synthesis, Properties and Applications," Advances in Polymer Science, 2002, pp. 1-65, 67-161, and 2 Preface pages, vol. 157, Springer-Verlag Berlin Heidelberg.

Filing receipt and specification for patent application entitled "Methods of Using Nanoparticle Suspension Aids in Subterranean Operations," by Philip D. Nguyen, et al., filed Jun. 21, 2012 as U.S. Appl. No. 13/529,413.

Filing receipt and specification for patent application entitled "Wellbore Servicing Methods and Compositions Comprising Degradable Polymers," by B. Raghava Reddy, et al., filed Oct. 25, 2012 as U.S. Appl. No. 13/660,740.

Filing receipt and specification for patent application entitled "Wellbore Servicing Fluids Comprising Foamed Materials and Methods of Making and Using Same," by Tingji Tang, et al., filed Oct. 26, 2012 as U.S. Appl. No. 13/662,000.

Filing receipt and specification for patent application entitled "Wellbore Servicing Materials and Methods of Making and Using Same," by Tingji Tang, filed Oct. 26, 2012 as U.S. Appl. No. 13/662,055.

Filing receipt and specification for patent application entitled "Expanded Wellbore Servicing Materials and Methods of Making and Using Same," by Tingji Tang, filed Oct. 26, 2012 as U.S. Appl. No. 13/662,105.

Halliburton brochure entitled "SandTrap® ABC Formation Consolidation Service," Sand Control Fluids and Pumping, Jun. 2011, 2 pages, Halliburton.

Office Action dated Jul. 17, 2013 (20 pages), U.S. Appl. No. 13/662,055, filed Oct. 26, 2012.

Foreign communication from a related counterpart application—International Search Report and Written Opinion, PCT/US2013/061434, dated Jan. 9, 2014, 12 pages.

Foreign communication from a related counterpart application—International Search Report and Written Opinion, PCT/US2013/061429, dated Dec. 20, 2013, 12 pages.

Foreign communication from a related counterpart application—International Search Report and Written Opinion, PCT/US2013/061437, dated Jan. 20, 2014, 10 pages.

\* cited by examiner

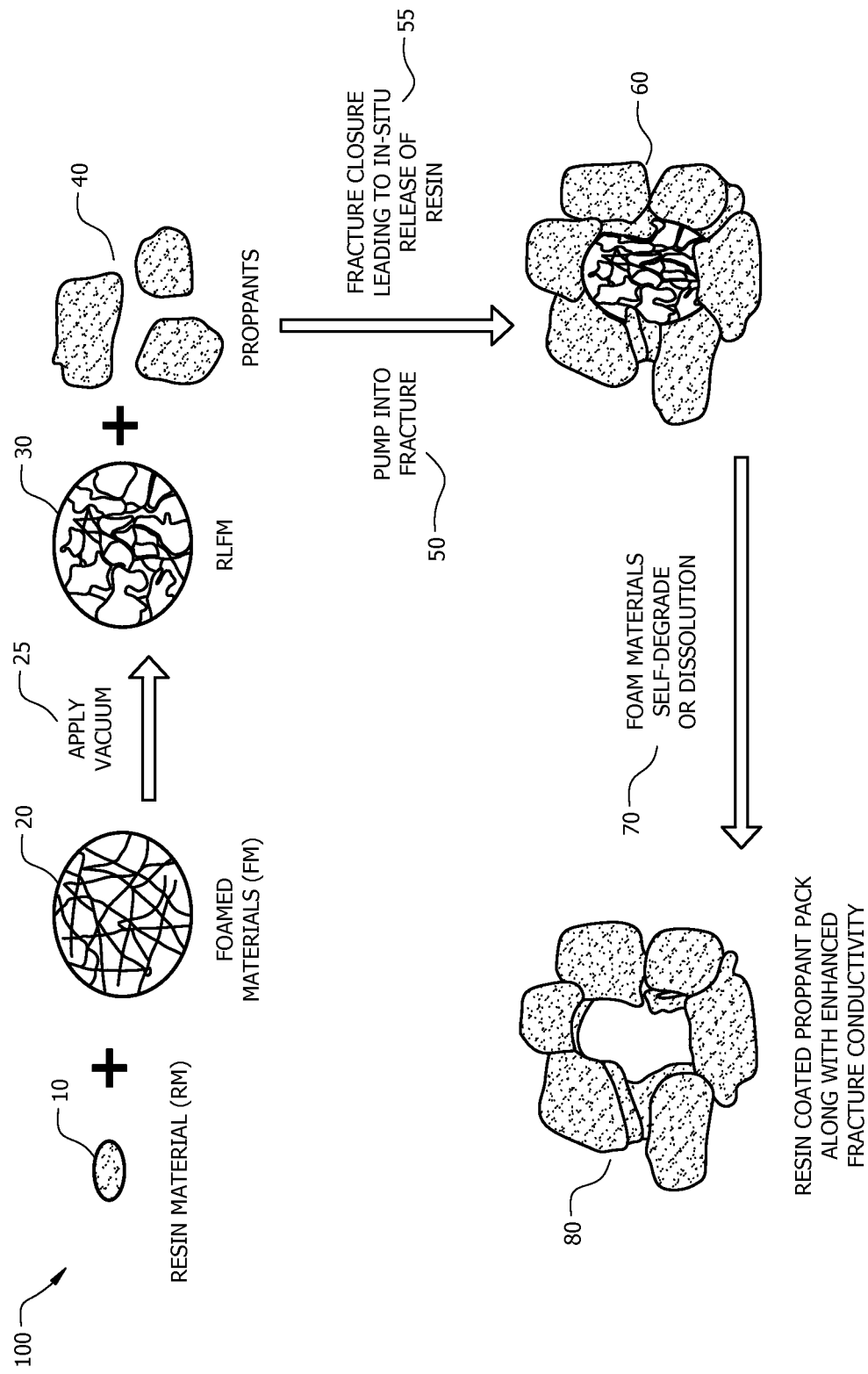

1

EXPANDED WELLBORE SERVICING MATERIALS AND METHODS OF MAKING AND USING SAME

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Field

This disclosure relates to methods of servicing a wellbore. More specifically, it relates to methods of servicing a wellbore with expanded materials.

Background

Natural resources (e.g., oil or gas) residing in the subterranean formation may be recovered by driving resources from the formation into the wellbore using, for example, a pressure gradient that exists between the formation and the wellbore, the force of gravity, displacement of the resources from the formation using a pump or the force of another fluid injected into the well or an adjacent well. The production of the fluid in the formation may be increased by hydraulically fracturing the formation. That is, a viscous fracturing fluid may be pumped down the wellbore at a rate and a pressure sufficient to form fractures that extend into the formation, providing additional pathways through which the oil or gas can flow to the well.

Certain wellbore servicing operations such as fracturing operations, stimulation operations and consolidation operations utilize consolidation agents such as resins. Resins are usually delivered as liquid solutions in the downhole formation, followed by the subsequent resin hardening in the formation. However, any delay at the wellbore site may cause the resin material to harden prior to reaching its target in the subterranean formation. Thus an ongoing need exists for improved methods for delivering the resin solution components.

SUMMARY

Disclosed herein is a method of servicing a wellbore in a subterranean formation comprising placing a wellbore servicing fluid comprising a resin-loaded expanded material into a wellbore wherein a resin is released from the resin-loaded expanded material in situ within the wellbore or subterranean formation.

Also disclosed herein is a wellbore treatment composition comprising a resin-loaded expanded material wherein the expanded material comprises polylactide and the resin material comprises a high-temperature epoxy-based resin.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

FIG. 1 is a graphical representation of resin loaded expanded materials.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques below, including the exemplary designs and implementations illustrated and described herein, but may be modified within the scope of the appended claims along with their full scope of equivalents.

Disclosed herein are wellbore servicing compositions comprising a loaded expanded material (LEM). In an embodiment, the LEMs comprise a first component which is effective as a carrier and a second component which is effective as a cargo. In an embodiment, the carrier comprises a material effective to and/or capable of engulfing, embedding, confining, surrounding, encompassing, enveloping, or otherwise retaining the cargo such that the carrier and cargo are transported downhole as a single material that is designated herein a carrier/cargo complex. In an embodiment, the cargo comprises a material that is carried or otherwise transported by the carrier material. In an embodiment, the carrier is an expanded material and the cargo may be dispersed throughout the material, contained within a portion of the expanded material, at least partially entangled or entwined with the expanded material, or otherwise associated with the expanded material such that the cargo and carrier are transported downhole about concurrently. Further it is to be understood the carrier confines the cargo to the extent necessary to facilitate the about concurrent transport of both materials into the wellbore and further that within the wellbore the carrier and cargo are located proximate to each other, for example in intimate contact. In an embodiment, the carrier encapsulates the cargo. For example, the cargo may be disposed within the carrier such that the entirety of the dimensions of the cargo lies within the dimensions of the carrier. Alternatively, at least a portion of the cargo is disposed within one or more internal spaces of the carrier. Alternatively, the cargo replaces some portion of the material typically found within the carrier. In an embodiment, the cargo is dispersed throughout the carrier and the carrier and cargo form a composite material. In an embodiment the cargo when placed downhole may be said to be limited to the confines dictated by the external or internal dimensions of the carrier.

In an embodiment, the carrier comprises an expanded material (EM) and the cargo comprises a resinous material (RM). In such instances, the carrier/cargo complex is designated a resin-loaded expanded material (RLEM). Hereinafter the disclosure will refer to a RLEM although other LEMs are also contemplated.

In an embodiment, the EM comprises a foam which herein refers to any substance compatible with the other components of the wellbore servicing composition that is formed by trapping pockets of gas in a liquid or solid. In an embodiment the foam is an open-cell structure foam which herein refers to a low porosity, low density foam typically containing pores that are connected to each other. In an embodiment, the foam is a closed cell-structure foam which herein refers to a foam characterized by pores which are not connected to each other and has a higher density and compressive strength when compared to open-cell structure foams.

In an embodiment, the EM may be comprised of a naturally-occurring material. Alternatively, the EM comprises a synthetic material. Alternatively, the EM comprises a mixture of a naturally-occurring and synthetic material. EMs suitable for use in this disclosure may comprise hydrocarbon-based materials (HBMs), degradable materials (DMs), or combinations thereof. In some embodiments, an HBM is also a DM or vice versa.

In an embodiment, the EM is a HBM. HBMs suitable for use in this disclosure may comprise polyethylene, polypropylene, polystyrene, hydrocarbon-based rubbers, (e.g., latex), copolymers thereof, derivatives thereof, or combinations thereof. The term "derivative" is defined herein to include any compound that is made from one or more of the HBMs, for example, by replacing one atom in the HBM with another atom or group of atoms, rearranging two or more atoms in the HBM, ionizing one of the HBMs, or creating a salt of one of the HBMs. The term "copolymer" as used herein is not limited to the combination of two polymers, but includes any combination of polymers, e.g., graft polymers, terpolymers and the like.

In an embodiment, the DMs comprise a degradable material that may undergo irreversible degradation downhole. As used herein "degradation" refers to the separation of the material into simpler compounds that do not retain all the characteristics of the starting material. The terms "degradation" or "degradable" may refer to either or both of heterogeneous degradation (or bulk erosion) and/or homogeneous degradation (or surface erosion), and/or to any stage of degradation in between these two. Not intending to be bound by theory, degradation may be a result of, inter alia, an external stimuli (e.g., heat, pH, etc.) As used herein, the term "irreversible" means that the degradable material, once degraded downhole, should not recrystallize or reconsolidate while downhole.

In an embodiment the DM comprises a degradable polymer. Herein the disclosure may refer to a polymer and/or a polymeric material. It is to be understood that the terms polymer and/or polymeric material herein are used interchangeably and are meant to each refer to compositions comprising at least one polymerized monomer in the presence or absence of other additives traditionally included in such materials. Examples of degradable polymers suitable for use in the present disclosure include, but are not limited to homopolymers, random, block, graft, star- and hyperbranched aliphatic polyesters, and combinations thereof. In an embodiment, the degradable polymer comprises polysaccharides; lignosulfonates; chitins; chitosans; proteins; proteinous materials; fatty alcohols; fatty esters; fatty acid salts; aliphatic polyesters; poly(lactides); poly(glycolides); poly(ε-caprolactones); polyoxymethylene; polyurethanes; poly(hydroxybutyrates); poly(anhydrides); aliphatic polycarbonates; polyvinyl polymers; acrylic-based polymers; poly(amino acids); poly(aspartic acid); poly(alkylene oxides); poly(ethylene oxides); polyphosphazenes; poly(orthoesters); poly(hydroxy ester ethers); polyether esters; polyester amides; polyamides; polyhdroxyalkanoates; polyethyleneterephthalates; polybutyleneterephthalates; polyethylenenaphthalenates, and copolymers, blends, derivatives, or combinations thereof. In an embodiment, the DM comprises BIOFOAM. BIOFOAM is a biodegradable plant-based foam commercially available from Synbra. Additional descriptions of degradable polymers suitable for use in the present disclosure may be found in the publication of Advances in Polymer Science, Vol. 157 entitled "Degradable Aliphatic Polyesters" edited by A. C. Albertsson, which is incorporated herein in its entirety.

In an embodiment, the degradable polymer comprises solid cyclic dimers, or solid polymers of organic acids. Alternatively, the degradable polymer comprises substituted or unsubstituted lactides, glycolides, polylactic acid (PLA), polyglycolic acid (PGA), copolymers of PLA and PGA, copolymers of glycolic acid with other hydroxy-, carboxylic acid-, or hydroxycarboxylic acid-containing moieties, copolymers of lactic acid with other hydroxy-, carboxylic acid-, or hydroxycarboxylic acid-containing moieties, or combinations thereof.

In an embodiment, the degradable polymer comprises an aliphatic polyester which may be represented by the general formula of repeating units shown in Formula I:

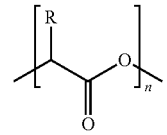

Formula I where n is an integer ranging from about 75 to about 10,000, alternatively from about 100 to about 500, or alternatively from about 200 to about 2000 and R comprises hydrogen, an alkyl group, an aryl group, alkylaryl groups, acetyl groups, heteroatoms, or combinations thereof.

In an embodiment, the aliphatic polyester comprises poly(lactic acid) or polylactide (PLA). Because both lactic acid and lactide can achieve the same repeating unit, the general term poly(lactic acid) as, used herein, refers to Formula I without any limitation as to how the polymer was formed (e.g., from lactides, lactic acid, or oligomers) and without reference to the degree of polymerization or level of plasticization.

Also, as will be understood by one of ordinary skill in the art, the lactide monomer may exist, generally, in one of three different forms: two stereoisomers L- and D-lactide and racemic D,L-lactide (meso-lactide). The oligomers of lactic acid, and oligomers of lactide suitable for use in the present disclosure may be represented by general Formula II:

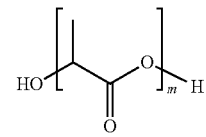

Formula II where m is an integer 2≤m≤75, alternatively, m is an integer and 2≤m≤10. In such an embodiment, the molecular weight of the PLA may be less than about 5,400 g/mole, alternatively, less than about 720 g/mole, respectively. The stereoisomers of lactic acid may be used individually or combined to be used in accordance with the present disclosure.

In an additional embodiment the degradable polymer comprises a copolymer of lactic acid. A copolymer of lactic acid may be formed by copolymerizing one or more stereoisomers of lactic acid with, for example, glycolide, ε-caprolactone, 1,5-dioxepan-2-one, or trimethylene carbonate, so as to obtain polymers with different physical and/or mechanical properties that are also suitable for use in the present disclosure. In an embodiment, degradable polymers suitable for use in the present disclosure are formed by blending, copolymerizing or otherwise mixing the stereoisomers of lactic acid. Alternatively degradable polymers suitable for use in the present disclosure are formed by blending, copolymerizing or otherwise mixing high and/or low molecular weight polylactides. Alternatively degradable polymers suitable for use in the present disclosure are formed by blending, copolymerizing or otherwise mixing polylactide with other polyesters. In an embodiment, the degradable polymer comprises PLA which may be synthesized using any suitable methodology. For example, PLA may be synthesized either from lactic acid by a condensation reaction or by a ring-opening polymerization of a cyclic lactide monomer. Methodologies for the preparation of PLA are described in U.S. Pat. Nos. 6,323,307; 5,216,050; 4,387,769; 3,912,692; and 2,703,316, each of which is incorporated herein in its entirety.

In an embodiment, the degradable polymer comprises a polyanhydride. Examples of polyanhydrides suitable for use in the present disclosure include, but are not limited to, poly(adipic anhydride), poly(suberic anhydride), poly(sebacic anhydride), poly(dodecanedioic anhydride), poly(maleic anhydride), poly(benzoic anhydride), or combinations thereof.

In an embodiment, the degradable polymer comprises polysaccharides, such as starches, cellulose, dextran, substituted galactomannans, guar gums, high-molecular weight polysaccharides composed of mannose and galactose sugars, galactomannans, heteropolysaccharides obtained by the fermentation of starch-derived sugar (e.g., xanthan gum), diutan, scleroglucan, derivatives thereof, or combinations thereof.

In an embodiment, the degradable polymer comprises guar or a guar derivative. Nonlimiting examples of guar derivatives suitable for use in the present disclosure include hydroxypropyl guar, carboxymethylhydroxypropyl guar, carboxymethyl guar, hydrophobically modified guars, guar-containing compounds, synthetic polymers, or combinations thereof.

In an embodiment, the degradable polymer comprises cellulose or a cellulose derivative. Nonlimiting examples of cellulose derivatives suitable for use in the present disclosure include cellulose ethers, carboxycelluloses, carboxyalkylhydroxyethyl celluloses, hydroxyethylcellulose, hydroxypropylcellulose, carboxymethylhydroxyethylcellulose, carboxymethylcellulose, or combinations thereof.

In an embodiment, the degradable polymer comprises a starch. Nonlimiting examples of starches suitable for use in the present disclosure include native starches, reclaimed starches, waxy starches, modified starches, pre-gelatinized starches, or combinations thereof.

In an embodiment, the degradable polymer comprises polyvinyl polymers, such as polyvinyl alcohols, polyvinyl acetate, partially hydrolyzed polyvinyl acetate, or combinations thereof.

In an embodiment, the degradable polymer comprises acrylic-based polymers, such as acrylic acid polymers, acrylamide polymers, acrylic acid-acrylamide copolymers, acrylic acid-methacrylamide copolymers, polyacrylamides, polymethacrylamides, partially hydrolyzed polyacrylamides, partially hydrolyzed polymethacrylamides, ammonium and alkali metal salts thereof, or combinations thereof.

In an embodiment, the degradable polymer comprises polyamides, such as polycaprolactam derivatives, poly-paraphenylene terephthalamide or combinations thereof. In an embodiment, the degradable polymer comprises Nylon 6,6; Nylon 6; KEVLAR, or combinations thereof.

The physical properties associated with the degradable polymer may depend upon several factors including, but not limited to, the composition of the repeating units, flexibility of the polymer chain, the presence or absence of polar groups, polymer molecular mass, the degree of branching, polymer crystallinity, polymer orientation, or the like. For example, a polymer having substantial short chain branching may exhibit reduced crystallinity while a polymer having substantial long chain branching may exhibit for example, a lower melt viscosity and impart, inter alia, elongational viscosity with tension-stiffening behavior. The properties of the degradable polymer may be further tailored to meet some user and/or process designated goal using any suitable methodology such as blending and copolymerizing the degradable polymer with another polymer, or by changing the macromolecular architecture of the degradable polymer (e.g., hyper-branched polymers, star-shaped, or dendrimers, etc.).

In an embodiment, in choosing the appropriate degradable polymer, an operator may consider the degradation products that will result. For example, an operator may choose the degradable polymer such that the resulting degradation products do not adversely affect one or more other operations, treatment components, the formation, or combinations thereof. Additionally, the choice of degradable polymer may also depend, at least in part, upon the conditions of the well.

Nonlimiting examples of degradable polymers suitable for use in conjunction with the methods of this disclosure are described in more detail in U.S. Pat. Nos. 7,565,929 and 8,109,335, and U.S. Patent Publication Nos. 20100273685 A1, 20110005761 A1, 20110056684 A1 and 20110227254 A1, each of which is incorporated by reference herein in its entirety.

In an embodiment, the degradable polymer further comprises a plasticizer. The plasticizer may be present in an amount sufficient to provide one or more desired characteristics, for example, (a) more effective compatibilization of the melt blend components, (b) improved processing characteristics during the blending and processing steps, (c) control and/or regulation of the sensitivity and degradation of the polymer by moisture, (d) control and/or adjust one or more properties of the expand (e.g., strength, stiffness, etc. . . . ) or combinations thereof. Plasticizers suitable for use in the present disclosure include, but are not limited to, derivatives of oligomeric lactic acid, such as those represented by the formula:

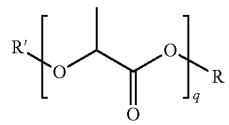

Formula III where R and/or R' are each a hydrogen, an alkyl group, an aryl group, an alkylaryl group, an acetyl group, a heteroatom, or combinations thereof provided that R and R' cannot both be hydrogen and that both R and R' are saturated; q is an integer where the value of q ranges from greater than or equal to 2 to less than or equal to 75 or alternatively from greater than or equal to 2 to less than or equal to 10. As used herein the term "derivatives of oligomeric lactic acid" may include derivatives of oligomeric lactide. In an embodiment where a plasticizer of the type disclosed herein is used, the plasticizer may be intimately incorporated within the degradable polymeric materials.

EMs of the type described herein (e.g., HBM or DM) may be expanded using any suitable methodology compatible with the methods of the present disclosure. Methods of expanding materials of the type disclosed herein (e.g., degradable polymers) include without limitation gas foaming, chemical agent foaming, injection molding, compression molding, extrusion molding, extrusion, melt extrusion, pressure reduction/vacuum induction, or any suitable combination of these methods.

In an embodiment, the EM may be prepared from a composition comprising a polymer and a foaming agent. The polymer may be of the type described previously herein (e.g., polystyrene, polylactide). The foaming agent may be any foaming agent compatible with the other components of the EM such as for example physical blowing agents, chemical blowing agents, and the like.

In an embodiment, the foaming agent is a physical blowing agent. Physical blowing agents are typically nonflammable gases that are able to evacuate the composition quickly after the foam is formed. Examples of physical blowing agents include without limitation pentane, carbon dioxide, nitrogen, water vapor, propane, n-butane, isobutane, n-pentane, 2,3-dimethylpropane, 1-pentene, cyclopentene, n-hexane, 2-methylpentane, 3-methylpentane, 2,3-dimethylbutane, 1-hexene, cyclohexane, n-heptane, 2-methylhexane, 2,2-dimethylpentane, 2,3-dimethylpentane, and combinations thereof. In an embodiment, the physical blowing agent is incorporated into the polymeric composition in an amount of from about 0.1 wt. % to about 10 wt. %, alternatively from about 0.1 wt. % to about 5.0 wt. %, or alternatively from about 0.5 wt. % to about 2.5 wt. %, wherein the weight percent is based on the total weight of the polymeric composition.

In an embodiment, the foaming agent is a chemical foaming agent, which may also be referred to as a chemical blowing agent. A chemical foaming agent is a chemical compound that decomposes endothermically at elevated temperatures. A chemical foaming agent suitable for use in this disclosure may decompose at temperatures of from about 250° F. to about 570° F., alternatively from about 330° F. to about 400° F. Decomposition of the chemical foaming agent generates gases that become entrained in the polymer thus leading to the formation of voids within the polymer. In an embodiment, a chemical foaming agent suitable for use in this disclosure may have a total gas evolution of from about 20 mug to about 200 ml/g, alternatively from about 75 mug to about 150 ml/g, or alternatively from about 110 ml/g to about 130 ml/g. Examples of chemical foaming agents suitable for use in this disclosure include without limitation SAFOAM FP-20, SAFOAM FP-40, SAFOAM FPN3-40, all of which are commercially available from Reedy International Corporation. In an embodiment, the chemical foaming agent may be incorporated in the polymeric composition (e.g., HBM, DM) in an amount of from about 0.10 wt. % to about 5 wt. % by total weight of the polymeric composition, alternatively from 0.25 about wt. % about to 2.5 wt. %, or alternatively from about 0.5 wt. % to about 2 wt. %.

In an embodiment, the EM is prepared by contacting the polymer with the foaming agent, and thoroughly mixing the components for example by compounding or extrusion. In an embodiment, the EM is plasticized or melted by heating in an extruder and is contacted and mixed thoroughly with a foaming agent of the type disclosed herein at a temperature of less than about 350° F. Alternatively, the EM may be contacted with the foaming agent prior to introduction of the mixture to the extruder (e.g., via bulk mixing), during the introduction of the polymer to an extruder, or combinations thereof. Methods for preparing a foamed polymer composition are described for example in U.S. Patent Publication No. 20090246501 A1, and U.S. Pat. Nos. 5,006,566 and 6,387,968, each of which is incorporated by reference herein in its entirety.

The EMs of this disclosure may be converted to foamed particles by any suitable method. The foamed particles may be produced about concurrently with the mixing and/or expanding of the EMs (e.g., on a sequential, integrated process line) or may be produced subsequent to mixing and/or foaming of the EM (e.g., on a separate process line such as an end use compounding and/or thermoforming line). In an embodiment, the EM is mixed and foamed via extrusion as previously described herein, and the molten EM is fed to a shaping process (e.g., mold, die, lay down bar, etc.) where the EM is shaped. The foaming of the EM may occur prior to, during, or subsequent to the shaping. In an embodiment, molten EM is injected into a mold, where the EM undergoes foaming and fills the mold to form a shaped article (e.g., beads, block, sheet, and the like), which may be subjected to further processing steps (e.g., grinding, milling, shredding, etc. . . . ).

In an embodiment, the EMs are further processed by mechanically sizing, cutting or, chopping the EM into particles using any suitable methodologies for such processes. The EMs suitable for use in this disclosure comprise foamed particles of any suitable geometry, including without limitation beads, hollow beads, spheres, ovals, fibers, rods, pellets, platelets, disks, plates, ribbons, and the like, or combinations thereof.

In an embodiment, the porosity of an EM suitable for use in this disclosure may range from about 20 volume percent (vol. %) to about 90 vol. %, alternatively from about 30 vol. % to about 70 vol. %, or alternatively from about 40 vol. % to about 50 vol. %. The porosity of a material is defined as the percentage of volume that the pores (i.e., voids, empty spaces) occupy based on the total volume of the material. The porosity of the EM may be determined using a porosity tester such as the Foam Porosity Tester F0023 which is commercially available from IDM Instruments.

In an embodiment, the pore size of an EM suitable for use in this disclosure may range from about 0.1 microns to about 500 microns, alternatively from about 5 microns to about 200 microns, or alternatively from about 10 microns to about 100 microns. The pore size of the material may be determined using any suitable methodology such as scanning electron microscopy, atomic force microscopy, or a porometer.

In an embodiment, EM particles suitable for use in conjunction with the methods of this disclosure comprise EMs having a bulk density from about 0.05 g/cc to about 1 g/cc, alternatively from about 0.1 g/cc to about 0.5 g/cc, or alternatively from about 0.1 g/cc to about 0.2 g/cc as determined by densitometry.

In an embodiment, the cargo comprises a RM. The RM may be disposed within or confined to some extent by the EM. In such embodiments, the RM is reversibly associated with the EM such that external stimuli will allow for the RM to disassociate from the EM. The RM may become disassociated from the EM as a result of external stimuli such as temperature, pressure, or pH. It is to be understood that the EM may be subjected to conditions that compromise the structural integrity of the EM to some extent such that the EM no longer confines the RM. Methods by which the RM becomes disassociated from the EM are described in more detail later herein. In an embodiment, the RM comprises a material which when dissociated from the EM provides one or more user and/or process desired functionalities. Nonlimiting examples of RMs suitable for use in this disclosure include consolidation agents, polysilicones, proppant coatings, wellbore stabilizers, sealants, stop circulation materials, or combinations thereof. In an embodiment, the RM comprises a hardenable resin in liquid form, a resin-precursor, or combinations thereof.

As will be understood by one of ordinary skill in the art, the RM may be converted from a relatively ductile or pliable state (e.g., viscosified liquid) to a solidified/hardened material by curing of the resin. Herein curing refers to the toughening or hardening of a polymeric material, for example by the crosslinking of polymer chains. In some embodiments, curing of the RM may be effected by chemical additives (e.g., hardeners) or through the use of stimuli such as heat. In an embodiment, the RM comprises a polymeric material that is cured through the use of an exogenous chemical additive. In an alternative embodiment, the RM comprises a material that is curable in the absence of an additional chemical additive.

In an embodiment, the RM comprises a curable organic resin such as polyepoxide resins, polyester resins, urea-aldehyde resins, furan resins, urethane resins, or combinations thereof.

In an embodiment, the RM comprises an acrylic-based resin. Nonlimiting examples of acrylic-based resins suitable for use in the present disclosure include ethyl acrylate, methyl methacrylate, n-butyl methylacryate, or combinations thereof. Acrylic-based resins suitable for use in the present disclosure may further comprise an initiator to initiate and cause the curing of these acrylic-based resins. Nonlimiting examples of initiators suitable for use in curing the acrylic-based resin include benzoyl peroxide, 2,2'-azobis-isobutyrylnitrile, or combinations thereof.

In an embodiment, the RM comprises a furan-based resin. Nonlimiting examples of furan-based resins suitable for use in the present disclosure include furfuryl alcohol resins, mixtures of furfuryl alcohol resins and aldehydes, and a mixture of furan resins and phenolic resins.

In an embodiment, the RM comprises a phenolic-based resin. Nonlimiting examples of phenolic-based resins suitable for use in the present disclosure include terpolymers of phenol, phenolic formaldehyde resins, and a mixture of phenolic and furan resins.

In an embodiment, the RM comprises a phenol/phenol formaldehyde/furfuryl alcohol resin comprising from about 5% to about 30% phenol, from about 40% to about 70% phenol formaldehyde, from about 10 to about 40% furfuryl alcohol, from about 0.1% to about 3% of a silane coupling agent, and from about 1% to about 15% of a surfactant. In an embodiment, the silane coupling agent comprises N-2-(aminoethyl)-3-aminopropyltrimethoxysilane, 3-glycidoxypropyltrimethoxysilane, N-β-(aminoethyl)-7-aminopropyl trimethoxysilane or combinations thereof. In an embodiment, the surfactant comprises an ethoxylated nonyl phenol phosphate ester, mixtures of one or more cationic surfactants, one or more non-ionic surfactants and an alkyl phosphonate surfactant or combinations thereof. In an embodiment, the solvent comprises 2-butoxy ethanol, butyl acetate, furfuryl acetate, or combinations thereof.

In an embodiment, the cargo comprises a mixture of an RM and a hardening composition. In such embodiments, the RM may comprise a resinous material and a solvent while the hardening composition may comprise a hardening agent, a silane coupling agent, a surfactant, an optional hydrolyzable ester, and an optional liquid carrier fluid for reducing the viscosity of the liquid hardening agent. In such embodiments the resinous material may comprise organic resins such as bisphenol A-epichlorohydrin resins, polyepoxide resins, novolac resins, polyester resins, phenol-aldehyde resins, urea-aldehyde resins, furan resins, urethane resins, glycidyl ethers, or combinations thereof.

Silane coupling agents that may suitably included in the hardening agent composition include without limitation N-2-(aminoethyl)-3-aminopropyltrimethoxysilane, 3-glycidoxypropyltrimethoxysilane, and N-beta-(aminoethyl)-gamma-aminopropyl trimethoxysilane, gamma-aminopropyltriethoxysilane, or combinations thereof. Surfactants that may be suitably included in the hardening agent composition include without limitation nonylphenylethoxylates with less than 5 moles of ethylene oxide, fatty acids and their salts, sorbitan trioleate, sorbitan monopalmitate, sorbitan monostearate, propylene glycol monolaurate, propylene glycol monostearate, sorbitan distearate or combinations thereof. Hydrolyzable esters that may be suitably included in the hardening agent composition include without limitation butyl acetate, furfuryl acetate, organic acids such as maleic acid, fumaric acid, inorganic acids such as phosphoric or sulfonic acid, and combinations thereof. Liquid carrier fluids that may be suitably utilized in the hardening agent composition include without limitation alky acetates such as butyl acetate, 2-butoxy ethanol, and combinations thereof. Hardening agents useful in such embodiments may comprise amines, aromatic amines, polyamines, aliphatic amines, cyclo-aliphatic amines, amides, polyamides, 2-ethyl-4-methyl imidazole and 1,1,3-trichlorotrifluoroacetone. Selection of a hardening agent depends, in part, on the temperature of the formation in which the hardening agent will be used. Nonlimiting examples of hardening agents suitable for use in subterranean formations having a temperature from about 60° F. to about 250° F. include amines and cyclo-aliphatic amines such as piperidine, triethylamine, N,N-dimethylaminopyridine, benzyldimethylamine, tris(dimethylaminomethyl) phenol, and 2-(N₂N-dimethylaminomethyl) phenol. In an embodiment, the hardening agent comprises N,N-dimethylaminopyridine. In subterranean formations having higher temperatures, (i.e., greater than about 300° F.) 4,4'-diaminodiphenyl sulfone may be a suitable hardening agent. The hardening agent used is included in the liquid hardening agent component in an amount sufficient to consolidate the hardenable resin.

In an embodiment, the RM comprises a high temperature (HT) epoxy-based resin. Nonlimiting examples of HT epoxy-based resins suitable for use in the present disclosure include bisphenol A-epichlorohydrin resins, polyepoxide resins, novolac resins, polyester resins, glycidyl ethers, and combinations thereof. A HT epoxy-based resin may be combined with a solvent to control viscosity if desired. Suitable solvents for use with the HT epoxy-based resins of the present disclosure are those solvents capable of substantially dissolving the HT epoxy-resin chosen for use in the resin. Nonlimiting examples of such solvents include dimethyl sulfoxide and dimethyl formamide. A co-solvent such as an alcohol, dipropylene glycol methyl ether, dipropylene glycol dimethyl ether, dimethyl formamide, diethylene glycol methyl ether, ethylene glycol butyl ether, diethylene glycol butyl ether, propylene carbonate, d-limonene and fatty acid methyl esters, may also be used in combination.

In an embodiment, the RM comprises one or more components of EXPEDITE proppant flowback control, SANDWEDGE conductivity enhancement system or combinations thereof. EXPEDITE service is proppant coating system and SANDWEDGE conductivity enhancement service is a proppant pack conductivity enhancer, each of which is commercially available from Halliburton Energy Services. Resin materials suitable for use in conjunction with this disclosure are described more in detail in U.S. Pat. Nos. 6,257,335 and 7,541,318, each of which is incorporated by reference herein in its entirety.

In an embodiment, the RM and EM are each present in amounts effective to perform its intended function. Thus, the amount of RM may range from about 0.1 wt. % to about 99 wt. %, alternatively from about 1 wt. % to about 99 wt. %, alternatively from about 10 wt. % to about 80 wt. %, or alternatively from about 30 wt. % to about 70 wt. %, based on the total weight of RM and EM, while the amount of EM may range from about 0.1 wt. % to about 99 wt. %, 1 wt. % to about 99 wt. %, alternatively from about 10 wt. % to about 80 wt. %, or alternatively from about 30 wt. % to about 70 wt. %, based on the total weight of RM and EM.

In an embodiment, a RM of the type disclosed herein is associated with an EM of the type disclosed herein using any suitable methodology to form a RLEM.

In an embodiment, the carrier comprises a particulate EM material and the cargo comprises an RM in liquid form. In such embodiments, the RLEM may be formed by impregnation of the EM with the RM liquid component under conditions suitable for association of the RM with the EM. For example, the EM and the RM liquid component may be mixed together under various pressure conditions (e.g., ambient pressure, vacuum over-pressured), such that the RM becomes associated with or otherwise disposed within the EM. In an embodiment, the RM is absorbed or diffuses into the EM using for example a pressure differential or a pressure and/or concentration gradient. In such embodiments, the association of the RM and EM may be reversed for example by inversion of the pressure and/or concentration gradient.

In an embodiment, the carrier comprises a EM of the type described previously herein. The EM may be in bulk form such that it is in the shape of a block, bar, sheet, and the like. The cargo may comprise a liquid RM of the type described previously herein. In such embodiments, the EM may be subjected to vacuum to remove the air and/or gas phase trapped inside its pores. Subsequently, the EM may be impregnated with the RM liquid component using techniques such as incipient wetness impregnation. For example, the EM and the RM liquid component may be mixed together under pressure such that the RM becomes associated with or otherwise disposed within the EM. The RLEM may be further mechanically sized into expanded material particulates using any suitable methodology (e.g., cutting, chopping, and the like). In the alternative, the EM may be further mechanically sized into expanded material particulates using any suitable methodology (e.g., cutting, chopping, and the like). The sized EM and the RM liquid component may be mixed together under pressure, such that the RM becomes associated with or otherwise disposed within the EM.

Alternatively, in an embodiment, the cargo comprises a RM of the type described previously herein. The carrier comprises a EM of the type described previously herein. In an embodiment, the EM may be expanded as previously described herein in the presence of the RM, resulting in the RM being entrapped and/or dispersed within the EM, forming the RLEM. The RLEM may be further mechanically sized into expanded material particulates using any suitable methodology (e.g., cutting, chopping, and the like).

In an embodiment, the RM comprises SANDWEDGE conductivity enhancement system and the EM comprises a polylactide. The RLEM may be formed by first subjecting the EM to a vacuum under conditions suitable to evacuate some portion of the gas occupying the EM pores. Subsequently, the EM and RM are contacted under conditions suitable for entrapment of the RM in the pores of the EM. This process 100 is illustrated in FIG. 1. Referring to FIG. 1, as part of a wellbore servicing operation (e.g., fracturing) a RM 10 may be contacted with an EM 20 and the mixture subjected to a vacuum 25. The resultant material which comprises a RM disposed within an EM 30 (i.e., a RLEM) may then be contacted with a proppant 40 which can be placed downhole 50. In an alternative embodiment, the RM 10 disposed within an EM 30 (i.e., a RLEM) may be contacted with a proppant 40 to in situ (i.e., within the wellbore). Subsequent to placement downhole the pressure may be released leading to closure of the fracture 55 and release of the RM 10. The RM 10, EM 70, and proppant 40 form a composition 60 which when exposed to typical wellbore conditions result in the self-degradation or dissolution of the EM 70 and formation of a resin coated proppant 80.

A RLEM of the type disclosed herein may be included in any suitable wellbore servicing fluid. As used herein, a "servicing fluid" refers to a fluid used to drill, complete, work over, fracture, repair, or in any way prepare a wellbore for the recovery of materials residing in a subterranean formation penetrated by the wellbore. Examples of wellbore servicing fluids include, but are not limited to, cement slurries, drilling fluids or muds, spacer fluids, lost circulation fluids, fracturing fluids or completion fluids. The servicing fluid is for use in a wellbore that penetrates a subterranean formation. It is to be understood that "subterranean formation" encompasses both areas below exposed earth and areas below earth covered by water such as ocean or fresh water. In an embodiment, the RLEM may be present in a wellbore servicing fluid in an amount of from about 0.01 pounds per gallon (ppg) to about 6 ppg, alternatively from about 0.1 ppg to about 4 ppg, or alternatively from about 0.1 ppg to about 2 ppg.

In an embodiment, the EM and the RM are manufactured and then contacted together at the well site, forming the RLEM as previously described herein. Alternatively, the EM and the RM are manufactured and then contacted together either off-site or on-the-fly (e.g., in real time or on-location), forming the RLEM as previously described herein. In another embodiment, either the EM or the RM would be preformed and the other one would be made on-the-fly, and the two materials would then be contacted together on-the-fly, forming the RLEM as previously described herein. When manufactured or assembled off site, the RM, EM and/or RLEM may be transported to the well site.

Alternatively, the RLEM may be assembled and prepared as a slurry in the form of a liquid additive. In an embodiment, the RLEM and a wellbore servicing fluid may be blended until the RLEM particulates are distributed throughout the fluid. By way of example, the RLEM particulates and a wellbore servicing fluid may be blended using a blender, a mixer, a stirrer, a jet mixing system, or other suitable device. In an embodiment, a recirculation system keeps the RLEM particulates uniformly distributed throughout the wellbore servicing fluid. In an embodiment, the wellbore servicing fluid comprises water, and may comprise at least one dispersant blended with the RLEM particulates and the water to reduce the volume of water required to suspend the RLEM particulates. An example of a suitable dispersant is FR-56 liquid friction reducer which is an oil-external emulsion or HYDROPAC service which a water-based viscous gel system each of which are commercially available from Halliburton Energy Services Inc. The concentration of the dispersant in the wellbore servicing fluid may be determined using any suitable methodology based on the desired slurry properties in accordance with conventional design techniques. In an alternative embodiment, the dispersant may already be present in the wellbore servicing fluid comprising water before the wellbore servicing fluid is blended with the RLEM. In an embodiment, a fracturing fluid is contacted with an RLEM of the type disclosed herein and placed downhole as illustrated in FIG. 1.

When it is desirable to prepare a fracturing fluid for use in a wellbore, the fracturing fluid prepared at the wellsite or previously transported to and, if necessary, stored at the on-site location may be combined with the RLEM and with additional water and optional other additives to form the fracturing fluid composition. In an embodiment a proppant may be added to the fracturing fluid on-the-fly along with the other components/additives. The resulting fracturing fluid composition may be pumped downhole where it may function as intended.

In an embodiment, a particulate proppant material is suspended in a fracturing fluid so that it is carried into the created fractures and deposited therein when the flow rate of the fracturing fluid and the pressure exerted on the fractured subterranean formation are reduced. The proppant is usually in the form of an insoluble particulate. The newly-created fracture will tend to close after the pumping of the fracturing fluid is stopped and the pressures are released. To prevent the fracture from closing, the proppant is placed in the fracture to keep the fracture propped open. The proppant holds the fracture open while still allowing fluid flow through the permeability of the proppant particulate. The fracture, especially if propped open by a proppant pack, provides an additional flow path for the oil or gas to reach the wellbore, which increases the rate of oil and/or gas production from the well. In an embodiment, the RLEM may be added to the fracturing fluid and pumped downhole at the same time with the proppant.

In an embodiment, the RLEM liquid additive is mixed with the additional water to form a diluted liquid additive, which is subsequently added to the fracturing fluid. The additional water may comprise fresh water, salt water such as an unsaturated aqueous salt solution or a saturated aqueous salt solution, or combinations thereof. In an embodiment, the liquid additive comprising the RLEM is injected into a delivery pump being used to supply the additional water to a fracturing fluid composition. As such, the water used to carry the RLEM particulates and this additional water are both available to the fracturing fluid composition such that the RLEM particulates may be dispersed throughout the fracturing fluid composition.

In an alternative embodiment, the RLEM prepared as a liquid additive is combined with a ready-to-use fracturing fluid as the fracturing fluid is being pumped into the wellbore. In such embodiments, the liquid additive may be injected into the suction of the pump. In such embodiments, the liquid additive can be added at a controlled rate to the water or the fracturing fluid using a continuous metering system (CMS) unit. The CMS unit can also be employed to control the rate at which the additional water is introduced to the fracturing fluid as well as the rate at which any other optional additives are introduced to the fracturing fluid or the water. As such, the CMS unit can be used to achieve an accurate and precise ratio of water to RLEM concentration in the fracturing fluid such that the properties of the fracturing fluid (e.g., density, viscosity), are suitable for the downhole conditions of the wellbore. The concentrations of the components in the fracturing fluid, e.g., the RLEMs, can be adjusted to their desired amounts before delivering the composition into the wellbore. Those concentrations thus are not limited to the original design specification of the fracturing fluid composition and can be varied to account for changes in the downhole conditions of the wellbore that may occur before the composition is actually pumped into the wellbore.

In an embodiment, the wellbore servicing fluid comprises a composite treatment fluid. As used herein, the term "composite treatment fluid" generally refers to a treatment fluid comprising at least two component fluids. In such an embodiment, the two or more component fluids may be delivered into the wellbore separately via different flowpaths (e.g., such as via a flowbore, a wellbore tubular and/or via an annular space between the wellbore tubular and a wellbore wall/casing) and substantially intermingled or mixed within the wellbore (e.g., in situ) so as to form the composite treatment fluid. Composite treatment fluids are described in more detail in U.S. Patent Publication No. 20100044041 A1 which is incorporated herein in its entirety.

In an embodiment, the composite treatment fluid comprises a fracturing fluid (e.g., a composite fracturing fluid). In such an embodiment, the fracturing fluid may be formed from a first component and a second component. For example, in such an embodiment, the first component may comprise a proppant-laden slurry (e.g., a concentrated proppant-laden slurry pumped via a tubular flowbore) and the second component may comprise a fluid with which the proppant-laden slurry may be mixed to yield the composite fracturing fluid, that is, a diluent (e.g., an aqueous fluid, such as water pumped via an annulus).

In an embodiment, the proppant-laden slurry (e.g., the first component) comprises a base fluid, proppants, and a RLEM of the type disclosed herein. In an embodiment, the base fluid may comprise a substantially aqueous fluid. As used herein, the term "substantially aqueous fluid" may refer to a fluid comprising less than about 25% by weight of a non-aqueous component, alternatively, less than about 20% by weight, alternatively, less than about 15% by weight, alternatively, less than about 10% by weight, alternatively, less than about 5% by weight, alternatively, less than about 2.5% by weight, alternatively, less than about 1.0% by weight of a non-aqueous component. Examples of suitable substantially aqueous fluids include, but are not limited to, water that is potable or non-potable, untreated water, partially treated water, treated water, produced water, city water, well-water, surface water, or combinations thereof. In an alternative or additional embodiment, the base fluid may comprise an aqueous gel, a viscoelastic surfactant gel, an oil gel, a foamed gel, an emulsion, an inverse emulsion, or combinations thereof.

In an embodiment, the diluent (e.g., the second component) may comprise a suitable aqueous fluid, aqueous gel, viscoelastic surfactant gel, oil gel, a foamed gel, emulsion, inverse emulsion, or combinations thereof. For example, the diluent may comprise one or more of the compositions disclosed above with reference to the base fluid. In an embodiment, the diluent may have a composition substantially similar to that of the base fluid, alternatively, the diluent may have a composition different from that of the base fluid.

In an alternative embodiment, the composite treatment fluid may comprise any suitable alternative treatment fluid. An example of suitable alternative treatment fluid includes, but is not limited to, an acidizing fluid, a liquefied hydrocarbon gas, and/or a reactive fluid.

Once placed downhole, the RLEM may undergo one or more transformations such that the RM is no longer associated with the EM. In an embodiment, the RLEM when subjected to the pressures utilized for a fracturing operation undergoes a conformational distortion that results in expulsion of the RM from the EM. In an alternative embodiment, the structural integrity of the EM is compromised as a result of interaction with one or degradation agents that function to degrade the components of the EM. The type of degradation agent utilized will depend on the nature of the EM. In an embodiment dissociation of the RLEM may occur under ambient conditions as a result of the wellbore environment (e.g., temperature, pressure, pH, water content, hydrocarbon content etc.)

In an embodiment the EM comprises a degradable polymer of the type previously disclosed herein (i.e., DM), which degrades due to, inter alia, a chemical and/or radical process such as hydrolysis or oxidation. As may be appreciated by one of skill in the art upon viewing this disclosure, the degradability of a polymer may depend at least in part on its backbone structure. For example, the presence of hydrolyzable and/or oxidizable linkages within the backbone structure may yield a material that will degrade as described herein. As may also be appreciated by one of skill in the art upon viewing this disclosure, the rates at which such polymers degrade may be at least partially dependent upon polymer characteristics such as the type of repetitive unit, composition, sequence, length, molecular geometry, molecular weight, morphology (e.g., crystallinity, size of spherulites, and orientation), hydrophilicity, hydrophobicity, surface area, and type of additives. Additionally, the ambient downhole environment to which a given polymer is subjected may also influence how it degrades, (e.g., temperature, presence of moisture, oxygen, microorganisms, enzymes, pH, the like, and combinations thereof).

In an embodiment, the DM comprises a degradable polymer having an enhanced surface area. Without wishing to be limited by theory, the larger the surface area exposed to a medium in which the material undergoes a reaction (e.g., hydrolytic degradation), the shorter the reaction time frame will be for a fixed amount of material, while keeping all the other conditions unchanged (e.g., same pressure, same temperature, etc.). For example, if polymeric material A is a nonporous solid having a mass x and a surface area y, then the expanded material of this disclosure obtained from polymer A that has the same mass x, may have a surface area of 2y, 5y, 10y, 20y, 50y, or 100y. As a result of having a larger surface area, the expanded material may display faster degradation times. In an embodiment, the EM displays a surface area that is increased with respect to the unexpanded material by a factor of about 50, alternatively by a factor of about 100, alternatively by a factor of about 200.

In an embodiment the DM comprises aliphatic polyesters of the type previously disclosed herein. In such an embodiment, the DM may be degraded in the presence of an acid (e.g., in situ, downhole) or base catalyst via hydrolytic cleavage. Not intending to be bound by theory, during hydrolysis, carboxylic end groups are formed during chain scission and this may enhance the rate of further hydrolysis. This mechanism is known in the art as "autocatalysis," and is thought to make polyester matrices more bulk eroding.

In an embodiment, the DMs is degraded (e.g., in situ, downhole) via hydrolytic or aminolytic degradation. In an embodiment, degradation of the EM is carried out in the presence of an accelerator. Herein an accelerator refers to a material that increases the rate of degradation of the EM. In an embodiment, the DMs are provided within a portion of the subterranean formation with an accelerator. In an embodiment, the accelerator comprises a base solution such as an ammonium hydroxide solution, an alcoholic alkaline solution, an alkaline amine solution, or combinations thereof. Other examples of base solutions suitable for use as accelerators are described in more detail in U.S. Patent Publication No. 20100273685 A1, which is incorporated by reference herein in its entirety.

In an embodiment, the accelerator used for the DMs degradation comprises water-soluble amines such as alkanolamines, secondary amines, tertiary amines, oligomers of aziridine, any derivatives thereof, or combinations thereof. Non-limiting examples of water-soluble amines suitable for use in conjunction with the methods of this disclosure are described in more detail in U.S. patent application Ser. No. 13/660,740 filed Oct. 25, 2012 and entitled "Wellbore Servicing Methods and Compositions Comprising Degradable Polymers," which is incorporated by reference herein in its entirety.

In an embodiment, the EM when subjected to degradation conditions of the type disclosed herein (e.g., elevated temperatures and/or pressures) substantially degrades in about 4 h, alternatively of about 6 h, or alternatively of about 12 h. Herein, "substantially degrades" refer to the loss of structural integrity such that the EM releases, is disassociated from and/or no longer confines greater than about 50% of the RM, alternatively greater than about 75% of the RM or alternatively greater than about 90% of the RM. In another embodiment, EMs of the type disclosed herein when subjected to a degradation agent substantially degrades in a time frame of less than about 1 week, alternatively less than about 2 days, or alternatively less than about 1 day.

In another embodiment, the EM comprises a material which is characterized by the ability to be degraded at bottom hole temperatures (BHT) of less than about 140° F., alternatively less than about 180° F., or alternatively less than about 220° F.

Coating proppants at the surface of the wellbore prior to the addition into a wellbore servicing fluid require extra surface equipment for mixing the resin components, and subsequently for coating the proppant with the resin. For example, in the case of coating sand proppant particles with SANDWEDGE conductivity enhancement service, the resin material is extremely sticky, and a great deal of effort in cleaning up may be required upon resin coating the sand proppant. This cleaning effort is drastically reduced in the case of RLEMs of the type disclosed herein since the resin mixing and proppant coating occurs in situ in the downhole formation. In an embodiment, the RLEMs and the proppant are pumped downhole in a single stream in a fracturing fluid, which may advantageously provide the release of the resin from the EM for coating the proppant in situ.

In an embodiment, the RLEM may provide advantageous in situ consolidation of the proppant grains. In such embodiments, the RLEM when released in proximity to the proppant may coat and assist in aggregation and consolidation of the proppant within the fracture in order to mitigate any proppant flowback issues.

In an embodiment, the RLEMs comprise a resin material that requires at least two components for the resin hardening process. In such embodiment, the RLEMs is pumped into the downhole formation, and the different resin components required for the resin hardening are advantageously released and contact each other in situ. In the case of mixing resin material components at the wellbore surface prior to pumping downhole, any delay in pumping the mixed resin materials downhole may cause the resin to harden prior to reaching its downhole formation target, which process may be undesirable. In an embodiment, the RLEMs of this disclosure may delay the contact of the RM and the proppant such that coating of the proppant with the RM occurs in proximity or within the fracture such that premature hardening of the resin is reduced or avoided.

The following are additional enumerated embodiments of the concepts disclosed herein.

A first embodiment which is a method of servicing a wellbore in a subterranean formation comprising;

placing a wellbore servicing fluid comprising a resin-loaded expanded material into a wellbore wherein a resin is released from the resin-loaded expanded material in situ within the wellbore or subterranean formation.

A second embodiment which is the method of the first embodiment wherein the expanded material comprises a hydrocarbon-based material, a degradable material, or combinations thereof.

A third embodiment which is the method of any of the first through second embodiments wherein the expanded material comprises an open-cell structure foam or a closed-cell structure foam.

A fourth embodiment which is the method of the second embodiment wherein the hydrocarbon-based material comprises polyethylene, polypropylene, polystyrene, hydrocarbon-based rubbers, (e.g., latex), any copolymers, blends, derivatives thereof, and the like, or combinations thereof.

A fifth embodiment which is the method of the second embodiment wherein the degradable material comprises a degradable polymer.

A sixth embodiment which is the method of the fifth embodiment wherein the degradable polymer comprises polysaccharides; lignosulfonates; chitins; chitosans; proteins; proteinous materials; fatty alcohols; fatty esters; fatty acid salts; aliphatic polyesters; poly(lactides); poly(glycolides); poly(ε-caprolactones); polyoxymethylene; polyurethanes; poly(hydroxybutyrates); poly(anhydrides); aliphatic polycarbonates; polyvinyl polymers; acrylic-based polymers; poly(amino acids); poly(aspartic acid); poly(alkylene oxides); poly(ethylene oxides); polyphosphazenes; poly (orthoesters); poly(hydroxy ester ethers); polyether esters; polyester amides; polyamides; polyhdroxyalkanoates; polyethyleneterephthalates; polybutyleneterephthalates; polyethylenenaphthalenates, and copolymers, blends, derivatives, or any combinations thereof.

A seventh embodiment which is the method of the sixth embodiment wherein the aliphatic polyester comprises a compound represented by general formula I:

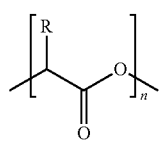

Formula I where n is an integer ranging from about 75 to about 10,000 and R comprises hydrogen, an alkyl group, an aryl group, alkylaryl groups, acetyl groups, heteroatoms, or combinations thereof.

An eighth embodiment which is the method of any of the second or fifth embodiments wherein the degradable polymer comprises polylactic acid.

A ninth embodiment which is the method of any of the first through eighth embodiments wherein the expanded material has a porosity of from about 20 vol. % to about 90 vol. %.

A tenth embodiment which is the method of an of the first through ninth embodiments wherein the expanded material has a pore size of from about 0.1 microns to about 500 microns.

A eleventh embodiment which is the method of any of the first through eleventh embodiments wherein the expanded material has a bulk density of from about 0.05 g/cc to about 1 g/cc.

A twelfth embodiment which is the method of any of the first through eleventh embodiments wherein the resin comprises thermoplastic resins, acrylic-based resins, two-component epoxy-based resins, furan-based resins, phenolic-based resins, high-temperature epoxy-based resins, phenol/phenol formaldehyde/furfuryl alcohol resins, polysilicones, polyepoxide resins, polyester resins, urea-aldehyde resins, urethane resins, or combinations thereof.

A thirteenth embodiment which is the method of any of the first through twelfth embodiments wherein the resin is present in an amount of from about 0.1 wt. % to about 99 wt. % and the expanded material is present in an amount of from about 0.1 wt. % to about 99 wt. % based on the total weight of the resin-loaded expanded material.

A fourteenth embodiment which is the method of any of the first through thirteenth embodiments wherein the resin-loaded expanded material is present in the wellbore servicing fluid in an amount of from about 0.01 ppg to about 6 ppg.

A fifteenth embodiment which is the method of any of the first through fourteenth embodiments wherein the wellbore servicing fluid comprises a fracturing fluid and a proppant.

A sixteenth embodiment which is the method of any of the first through fifteenth embodiments further comprising altering the structural integrity of the resin-loaded expanded material.

A seventeenth embodiment which is the method of the sixteenth embodiment wherein the structural integrity of the resin-loaded expanded material is altered by compression, contact with a degradation agent, or both.

An eighteenth embodiment which is the method of the seventeenth embodiment wherein the degradation agent a base solution, an ammonium hydroxide solution, an alcoholic alkaline solution, an alkaline amine solution, or combinations thereof.

A nineteenth embodiment which is a wellbore treatment composition comprising:

a resin-loaded expanded material wherein the expanded material comprises polylactide and the resin material comprises a high-temperature epoxy-based resin.

A twentieth embodiment which is the composition of the nineteenth embodiment further comprising a proppant.

While embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_L$, and an upper limit, $R_U$, is disclosed, any number falling within the range is specifically disclosed. In particular, the following numbers within the range are specifically disclosed: $R=R_L+k^*(R_U-R_L)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the embodiments of the present invention. The discussion of a reference in the Description of Related Art is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A method of servicing a wellbore in a subterranean formation comprising:
   adding a liquid additive to a wellbore servicing fluid, wherein the liquid additive comprises a resin-loaded expanded material that comprises a resin and an expanded material comprising a foam; and
   placing the wellbore servicing fluid into the wellbore, wherein the resin is released from the resin-loaded expanded material in situ within the wellbore or the subterranean formation, and
   wherein the resin at least partially coats a proppant in situ within the wellbore or the subterranean formation after being released.

2. The method of claim 1 wherein the foam is selected from the group consisting of: a hydrocarbon-based material, a degradable material, and any combination thereof.

3. The method of claim 1 wherein the foam comprises an open-cell structure foam or a closed-cell structure foam.

4. The method of claim 2 wherein the foam is the hydrocarbon-based material, and wherein the hydrocarbon-based material is selected from the group consisting of: polyethylene, polypropylene, polystyrene, a hydrocarbon-based rubber (e.g., latex), any copolymer, any blend, any derivative thereof, and any combination thereof.

5. The method of claim 2 wherein the hydrocarbon-based material is the degradable material, and wherein the degradable material comprises a degradable polymer.

6. The method of claim 5 wherein the degradable polymer is selected from the group consisting of: a polysaccharide, a lignosulfonate, a chitin, a chitosan, a protein, a proteinous material, a fatty alcohol, a fatty ester, a fatty acid salt, an aliphatic polyester, a poly(lactide), a poly(glycolide), a poly(ϵ-caprolactone), a polyoxymethylene, a polyurethane, a poly(hydroxybutyrate), a poly(anhydride), an aliphatic polycarbonate, a polyvinyl polymer, an acrylic-based polymer, a poly(amino acid), a poly(aspartic acid), a poly(alkylene oxide), a poly(ethylene oxide), a polyphosphazene, poly(orthoester), a poly(hydroxy ester ether), a polyether ester, a polyester amide, a polyamide, a polyhydroxyalkanoate, a polyethyleneterephthalate, a polybutyleneterephthalate, a polyethylenenaphthalenate, any copolymer, any blend, any derivative, and any combination thereof.

7. The method of claim 6 wherein the degradable polymer is the aliphatic polyester, and wherein the aliphatic polyester comprises a compound represented by general formula I:

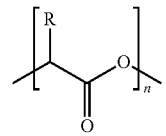

Formula I where n is an integer ranging from about 75 to about 10,000 and R comprises hydrogen, an alkyl group, an aryl group, an alkylaryl group, an acetyl group, a heteroatom, and any combination thereof.

8. The method of claim 5 wherein the degradable polymer comprises polylactic acid.

9. The method of claim 1 wherein the expanded material has a porosity of from about 20 vol. % to about 90 vol. %.

10. The method of claim 1 wherein the expanded material has a pore size of from about 0.1 microns to about 500 microns.

11. The method of claim 1 wherein the expanded material has a bulk density of from about 0.05 g/cc to about 1 g/cc.

12. The method of claim 1 wherein the resin is selected from the group consisting of: a thermoplastic resin, an acrylic-based resin, a two-component epoxy-based resin, a furan-based resin, a phenolic-based resin, a high-temperature epoxy-based resin, a phenol/phenol formaldehyde/furfuryl alcohol resin, a polysilicone, a polyepoxide resin, a polyester resin, an urea-aldehyde resin, an urethane resin, and any combination thereof.

13. The method of claim 1 wherein the resin is present in an amount of from about 0.1 wt. % to about 99 wt. % and the expanded material is present in an amount of from about 0.1 wt. % to about 99 wt. % based on the total weight of the resin-loaded expanded material.

14. The method of claim 1 wherein the resin-loaded expanded material is present in the wellbore servicing fluid in an amount of from about 0.01 ppg to about 6 ppg.

15. The method of claim 1 wherein the wellbore servicing fluid is a fracturing fluid.

16. The method of claim 1 further comprising altering the structural integrity of the resin-loaded expanded material.

17. The method of claim 16 wherein the structural integrity of the resin-loaded expanded material is altered by compression, contact with a degradation agent, or both.

18. The method of claim 17 wherein the degradation agent comprises a solution selected from the group consisting of: a base solution, an ammonium hydroxide solution, an alcoholic alkaline solution, an alkaline amine solution, and any combination thereof.

19. The method of claim 1 wherein the wellbore servicing fluid comprises the proppant.

20. The method of claim 1 wherein the resin at least partially coats the proppant in situ within a fracture in the subterranean formation.

* * * * *